US011206385B2

(12) United States Patent
Zavesky et al.

(10) Patent No.: US 11,206,385 B2
(45) Date of Patent: *Dec. 21, 2021

(54) VOLUMETRIC VIDEO-BASED AUGMENTATION WITH USER-GENERATED CONTENT

(71) Applicant: AT&T Intellectual Property I, L.P., Atlanta, GA (US)

(72) Inventors: Eric Zavesky, Austin, TX (US); Zhu Liu, Marlboro, NJ (US); David Crawford Gibbon, Lincroft, NJ (US); Behzad Shahraray, Holmdel, NJ (US); Tan Xu, Bridgewater, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/013,808

(22) Filed: Sep. 7, 2020

(65) Prior Publication Data

US 2020/0404237 A1 Dec. 24, 2020

Related U.S. Application Data

(63) Continuation of application No. 16/201,525, filed on Nov. 27, 2018, now Pat. No. 10,771,763.

(51) Int. Cl.
*H04N 21/81* (2011.01)
*H04N 13/156* (2018.01)
(Continued)

(52) U.S. Cl.
CPC ....... *H04N 13/156* (2018.05); *G06K 9/00744* (2013.01); *G06K 9/6202* (2013.01); *G06T 7/70* (2017.01); *G06T 15/04* (2013.01); *G06T 17/00* (2013.01); *G06T 19/20* (2013.01); *G11B 27/036* (2013.01); *H04N 13/117* (2018.05);
(Continued)

(58) Field of Classification Search
CPC .......................... H04N 21/8146; H04N 21/816
See application file for complete search history.

(56) References Cited

U.S. PATENT DOCUMENTS 8,538,678 B2  9/2013  Arrasvuori et al.
9,277,164 B2  3/2016  Lane
(Continued)

OTHER PUBLICATIONS

Bailer, Werner, et al. "Content and Metadata Workflow for User Generated Content in Live Production." Proceedings of the 13th European Conference on Visual Media Production (CVMP 2016). ACM, 2016.

*Primary Examiner* — Ryan McCulley (57) ABSTRACT

A processing system having at least one processor may obtain a two-dimensional source video, select a volumetric video associated with at least one feature of the source video from a library of volumetric videos, identify a first object in the source video, and determine a location of the first object within a space of the volumetric video. The processing system may further obtain a three-dimensional object model of the first object, texture map the first object to the three-dimensional object model of the first object to generate an enhanced three-dimensional object model of the first object, and modify the volumetric video to include the enhanced three-dimensional object model of the first object in the location of the first object within the space of the volumetric video.

20 Claims, 3 Drawing Sheets

(51) Int. Cl.
  *G06T 15/04* (2011.01)
  *G06K 9/00* (2006.01)
  *G06T 17/00* (2006.01)
  *G06T 7/70* (2017.01)
  *G06K 9/62* (2006.01)
  *H04N 13/117* (2018.01)
  *G11B 27/036* (2006.01)
  *G06T 19/20* (2011.01)

(52) U.S. Cl.
  CPC ....... *H04N 21/816* (2013.01); *H04N 21/8146* (2013.01); *G06T 2207/10021* (2013.01); *G06T 2219/2004* (2013.01)

(56) References Cited

U.S. PATENT DOCUMENTS

| | | | |
|---|---|---|---|
| 9,424,255 B2 | 8/2016 | Pengelly et al. | |
| 9,509,968 B2 | 11/2016 | Zimmermann et al. | |
| 10,127,722 B2 | 11/2018 | Shakib et al. | |
| 2009/0021513 A1 | 1/2009 | Joshi et al. | |
| 2010/0287611 A1 | 11/2010 | Blom et al. | |
| 2011/0123117 A1 | 5/2011 | Johnson et al. | |
| 2011/0173565 A1 | 7/2011 | Ofek et al. | |
| 2011/0249090 A1 | 10/2011 | Moore et al. | |
| 2012/0050491 A1 | 3/2012 | Seshadri et al. | |
| 2012/0142415 A1 | 6/2012 | Lindsay | |
| 2014/0286624 A1 | 9/2014 | Eronen et al. | |
| 2016/0041998 A1 | 2/2016 | Hall et al. | |
| 2017/0236329 A1 | 8/2017 | Harvey | |
| 2017/0238055 A1* | 8/2017 | Chang | G06F 3/013 725/19 |
| 2017/0324961 A1 | 11/2017 | Jin et al. | |
| 2018/0091791 A1 | 3/2018 | Jiang et al. | |
| 2018/0160194 A1 | 6/2018 | Bayliss et al. | |
| 2018/0190017 A1 | 7/2018 | Mendez et al. | |
| 2018/0342267 A1 | 11/2018 | Popa et al. | |
| 2019/0094981 A1 | 3/2019 | Bradski et al. | |
| 2019/0147221 A1 | 5/2019 | Grabner et al. | |
| 2019/0230317 A1 | 7/2019 | Sheftel et al. | |

\* cited by examiner

VOLUMETRIC VIDEO-BASED AUGMENTATION WITH USER-GENERATED CONTENT

This application is a continuation of U.S. patent application Ser. No. 16/201,525, filed on Nov. 27, 2018, now U.S. Pat. No. 10,771,763, which is herein incorporated by reference in its entirety.

The present disclosure relates generally to visual communication sessions, and more particularly to methods, computer-readable media, and devices for modifying a volumetric video to include an enhanced three-dimensional object model of an object from a two-dimensional source video.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a method, computer-readable medium, and device for modifying a volumetric video to include an enhanced three-dimensional object model of an object from a two-dimensional source video. For instance, in one example, a method may include a processing system having at least one processor obtaining a two-dimensional source video, selecting a volumetric video associated with at least one feature of the source video from a library of volumetric videos, identifying a first object in the source video, and determining a location of the first object within a space of the volumetric video. The processing system may further obtain a three-dimensional object model of the first object, texture map the first object to the three-dimensional object model of the first object to generate an enhanced three-dimensional object model of the first object, and modify the volumetric video to include the enhanced three-dimensional object model of the first object in the location of the first object within the space of the volumetric video.

Examples of the present disclosure match two-dimensional (2D) objects from user-generated video (also referred to herein as user-generated content (UGC) to three-dimensional (3D) counterparts for volumetric video (VV). For instance, a 2D object may be detected in a source video, a counterpart 3D object model of a same object type may be obtained and enhanced via texture mapping with the visual information of the 2D object, and the enhanced 3D object model may be placed into the volumetric video. The volumetric video may then be presented and/or experienced by a user including the enhanced 3D object model associated with the 2D object. In addition, in one example, a traversal of the volumetric video including the enhanced 3D object model may be captured and exported to a new 2D video. In one example, user preferences and/or user interactions with an automated processing system may guide the matches between objects in the 2D user-generated video and 3D object models. In accordance with the present disclosure, 2D user-generated video may comprise analog video, e.g., 35 mm video reels, digitized 35 mm, digital videos, e.g., H.264 (Advanced Video Coding (AVC)), H.265 (High Efficiency Video Coding (HEVC)), Moving Picture Expert Group (MPEG) .mpeg files, .mov files, .mp4 files, 0.3 gp files, .f4f files, .m3u8 files, and so forth. Examples of the present disclosure provide the bridging of these "historical" assets into new volumetric video experiences as well as the opportunity to regenerate two-dimensional videos with new volumetric video details (e.g., environments, historical events, etc.).

An example of the operations of the present disclosure may proceed as follows. A processing system may first obtain a 2D source video (e.g., a user-generated video). The source video may be historic (e.g., recorded and stored in one or more machine-readable formats) or may be a video stream from a video capture device, such as any user endpoint device including but not limited to a digital camera, a smartphone, a web-camera, a home-base or business-based security camera, and so forth. The processing system may then search for and rank one or more volumetric videos overlapping with the content of the source video. The content matching may be based upon one or more user-provided criteria (or "factors"), or may be based upon one or more default criteria, such as the two-dimensional source video and the volumetric video being of/from a same location, being recorded at a same time, including a same object (e.g., a landmark, a moveable object, etc.), and so forth. For instance, a user can specify certain criteria as providing a greater weight for matching, e.g., a same location may be required, while the user may be flexible as to the time of recording. In another example, a user may express a preference for a volumetric video of a same location as the 2D source video, but specifically for a different time period. For example, the user may wish to associate one or more objects from the 2D source video with content from the volumetric video relating to a historic event at the same location (e.g., a concert, a speech, a party, a sporting event, etc.).

In one example, matching between the 2D source video and a stored volumetric video may be made directly via the respective metadata (e.g., time tags, location tags, object tags, event tags, keywords, etc.). Alternatively, or in addition, a matching may be made by performing object detection/recognition processes (e.g., via machine learning-based object detection/recognition models) with respect to either or both of the 2D source video or the volumetric video, and then confirming the presence of the same factors in both the 2D source video and the volumetric video. In one example, a user associated with the 2D source video may be prompted to annotate one or more objects and/or the 2D source video with keywords, tags, or the like.

In one example, a user may be presented with a ranked list of volumetric videos comprising potential matches to the 2D source video from which the user may select one for further processing. For instance, results may be ranked by time (e.g., date and time, by the time of year/season, etc.), location, and/or environmental similarity (e.g., rainy, snowy, cloudy, windy, sunny, bright, dark, clear, etc.) to the source video. When the user does not have a device capable of experiencing volumetric video, a 2D snapshot or video clip representation of the volumetric video may be provided for the user to preview in connection with the selection. In another example, the processing system may select a top matching volumetric video for further processing.

In one example, the processing system may determine a position of at least one object of the 2D source video within a space of the volumetric video. The determining of the position may account for a location of a device recording the video, a bearing to an object, an estimated range to the object, a translation of a position of the device in a physical space to a position in a space of the volumetric video, and so forth. In one example, the processing system may calculate one or more adjustment factors to position the visual information of the 2D source video correctly within the space of the volumetric video. For instance, the physical space may include reference points having known corresponding locations/positions in the space of the volumetric video from which the processing system may compute a transformation matrix to translate coordinates of objects in the source video into corresponding coordinates in the space of the volumetric video. In one example, 2D/planar objects from the source video may be matched against a precomputed library of 2D objects to identify an object type. In one example, the matching may be a visual matching, e.g., using machine learning over low level and/or high level visual features of the object from the 2D source video. In an example where the object is tagged with a label, the matching may comprise performing a lookup of an object matching the label. In addition, in one example, the processing system may also store or have access to 3D object models which are associated with the 2D objects. For instance, a database may store 2D objects and corresponding "mapped" 3D object models.

In one example, the processing system may retrieve a corresponding 3D object model, and may texture map the visual content of the 2D object from the source video to the 3D object model to create an enhanced 3D object model. The texture mapping may include diffuse mapping, two-part mapping/intermediate mapping to an intermediate object, bump mapping, etc. For instance, visual information of the 2D object or "texture" (e.g., textels) may replace visual information in certain locations of the surface of the 3D object model. In one example, the visual information of the 2D object may be integrated with the visual information of the 3D object model at textel/texture boundaries derived from the visual information of the 2D object model. As such, the enhanced 3D object model may be considered as an estimate of what the 2D object would look like if full 3D information were available from the source video or elsewhere. The enhanced 3D object model may then be placed into the volumetric video at the location in the space of the volumetric video that is determined. In one example, an audio portion of the volumetric video may also be modified to account for the presence of the object (e.g., to include audio from the 2D source video).

In one example, a user may review a temporary volumetric video (e.g., modified as described above with the enhanced 3D object model) and then choose to manipulate or explore output view positions. The user may also modify object(s) or scene(s), followed by further automatic optimization. For instance, a user interface may enable a user to interact with and change the enhanced 3D object model, such as to change colors, shading, texture, size, position, orientation, etc. The user may also select a different 3D object model. For instance, the processing system may identify the 2D object as a "cat," but the user may manually specify that the object is a "dog." As such, the processing system may perform another texture mapping to a 3D object model for "dog" to make this correction. In such an example, the volumetric video may then be re-adjusted to account for such changes.

In one example, the modified volumetric video may be stored, e.g., as a new volumetric video or new version of the volumetric video, by overwriting a previous version of the volumetric video, etc. Alternatively, or in addition, a 2D traversal, or "exploration" of the volumetric video may be stored and/or exported as a new output 2D video. In one example, the processing system may update one or more 2D object detection/recognition models in accordance with user feedback or based upon user actions for improved indexing. For example, if a user has manually corrected a 3D object model to "dog" instead of "cat," this fact may be used as a negative example/feedback to retrain the 2D detection/recognition model for "cat."

Examples of the present disclosure provide a potential market for owners of content libraries by offering augmentation and upgrade capabilities. In addition, examples of the present disclosure enable users to regenerate video content from different angles that may capture more interesting details or other background visual information obtained from volumetric videos. Furthermore, an object from a 2D source video may be represented in a 3D format in a volumetric video without having to recapture from multiple angles, without having to provide precise lighting and other condition information, and so forth. In particular, 3D representations of 2D objects may be estimated from texture mapping to 3D object models of the same object types. Thus, efficient access to 3D rendering is provided to users without each user having to individually utilize a full volumetric video capture system. These and other aspects of the present disclosure are described in greater detail below in connection with the examples of FIGS. 1-3.

Figure 1:
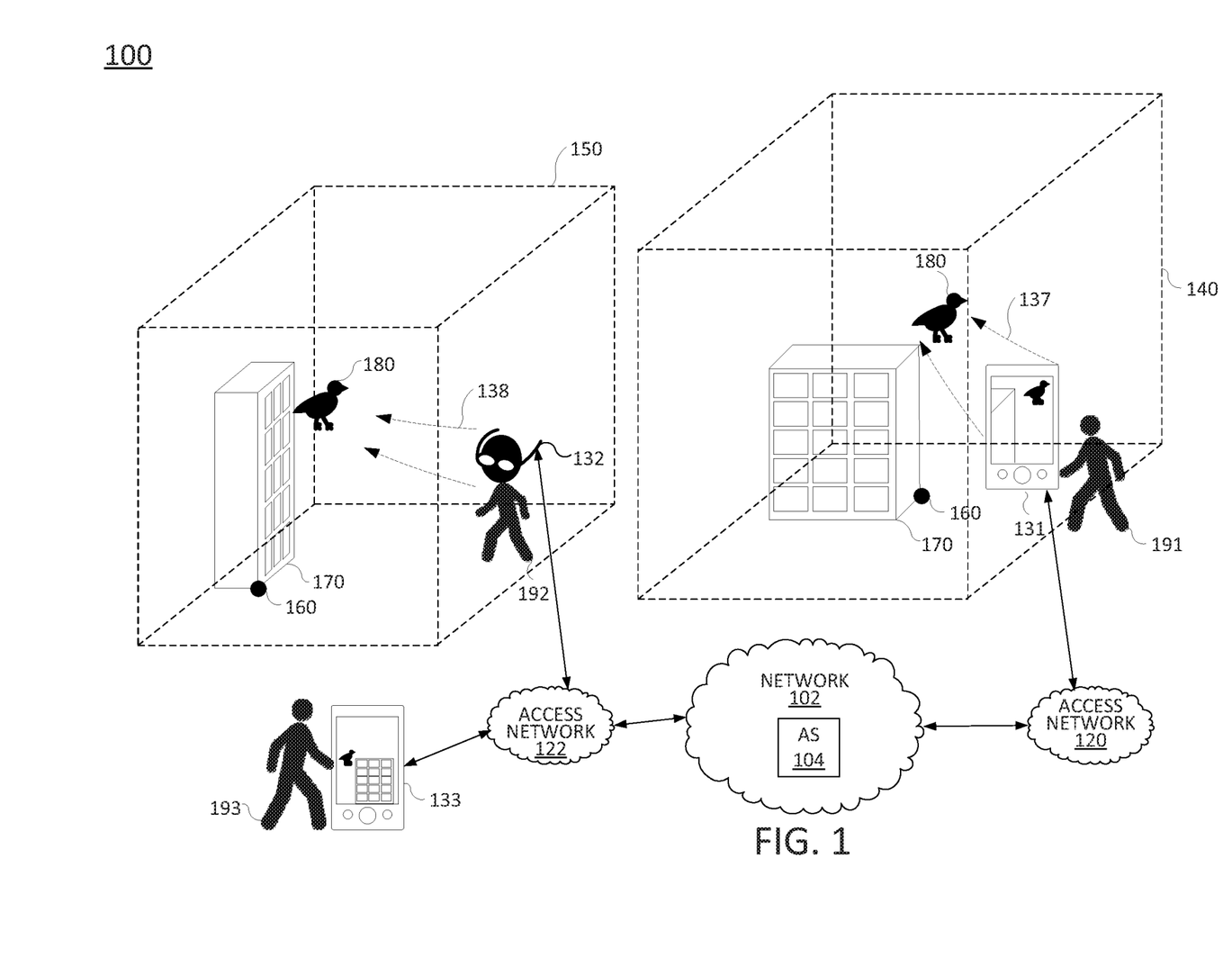
FIG. 1 illustrates an example network related to the present disclosure.

To further aid in understanding the present disclosure, FIG. 1 illustrates an example system 100 in which examples of the present disclosure for modifying a volumetric video to include an enhanced three-dimensional object model of an object from a two-dimensional source video may operate. The system 100 may include any one or more types of communication networks, such as a traditional circuit switched network (e.g., a public switched telephone network (PSTN)) or a packet network such as an internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like, related to the current disclosure. It should be noted that an IP network is broadly defined as a network that uses internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and providing communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

Figure 3:
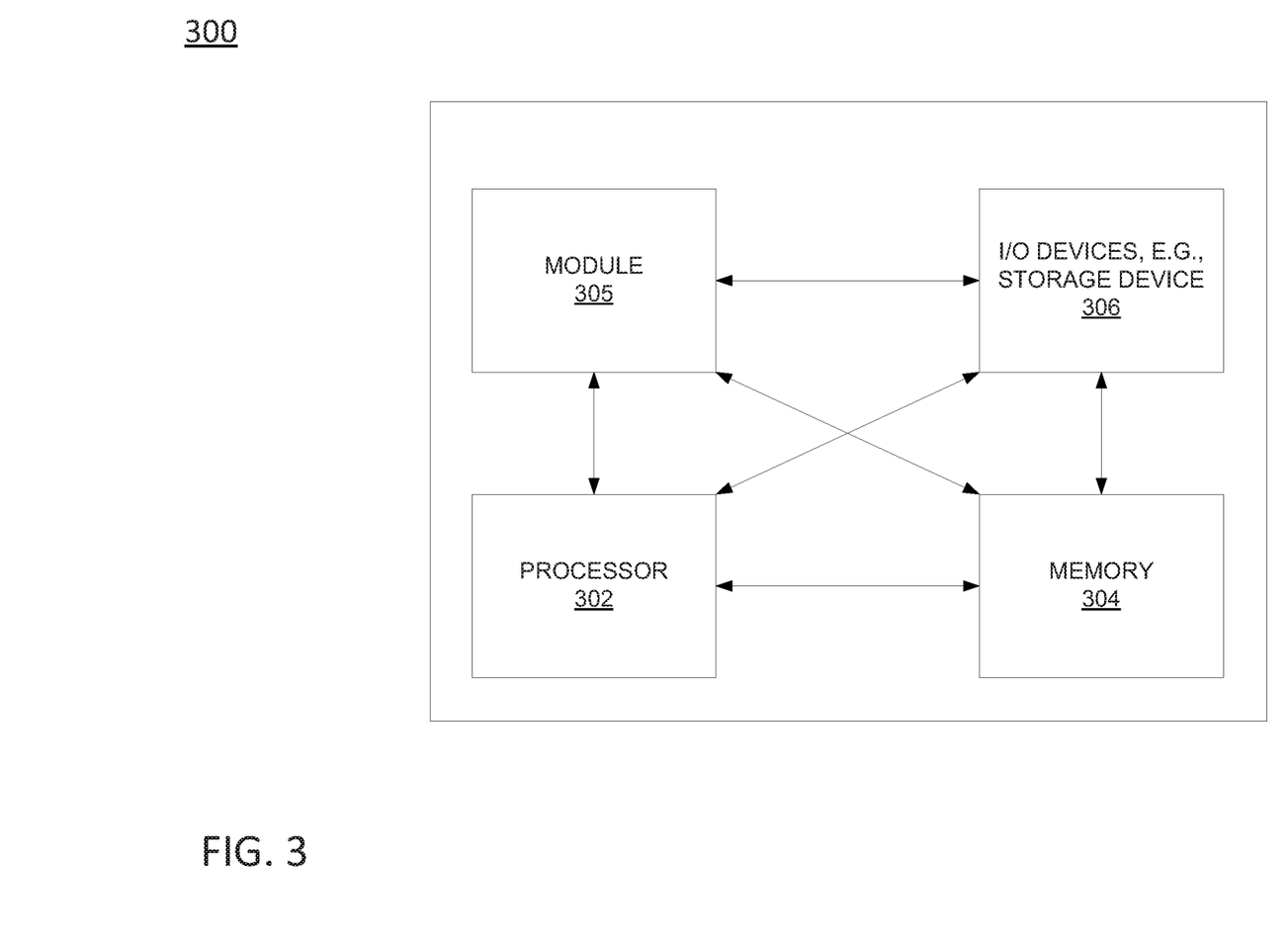
FIG. 3 illustrates a high level block diagram of a computing device specifically programmed to perform the steps, functions, blocks and/or operations described herein.

In accordance with the present disclosure, application server (AS) 104 may comprise a computing system or server, such as computing system 300 depicted in FIG. 3, and may be configured to provide one or more operations or functions for modifying a volumetric video to include an enhanced three-dimensional object model of an object from a two-dimensional source video, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

Thus, although only a single application server (AS) 104 is illustrated, it should be noted that any number of servers may be deployed, and which may operate in a distributed and/or coordinated manner as a processing system to perform operations for modifying a volumetric video to include an enhanced three-dimensional object model of an object from a two-dimensional source video, in accordance with the present disclosure. In one example, AS 104 may comprise a physical storage device (e.g., a database server), to store various types of information in support of systems for modifying a volumetric video to include an enhanced three-dimensional object model of an object from a two-dimensional source video, in accordance with the present disclosure. For example, AS 104 may store a library of volumetric videos, a plurality of 2D object detection/recognition models (e.g., machine learning-based image detection models), a catalog matching 2D objects to 3D object models, user preferences for volumetric video matching, and so forth that may be processed by AS 104 in connection with modifying a volumetric video to include an enhanced three-dimensional object model of an object from a two-dimensional source video. AS 104 may further store additional information such as a lexicon of topic models, e.g., machine learning-based models to identify topics and/or themes in 2D and/or volumetric video, and so forth. For ease of illustration, various additional elements of network 102 are omitted from FIG. 1.

As referred to herein, a machine learning model (MLM) (or machine learning-based model) may comprise a machine learning algorithm (MLA) that has been "trained" or configured in accordance with input data (e.g., training data) to perform a particular service, e.g., to detect a type of 2D object in image and/or video content. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth.

The types of features from which 2D object detection/recognition models may be derived may include visual features from 2D video. For instance, the visual features may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in communication with a device 131. Similarly, access network 122 may be in communication with one or more devices, e.g., devices 132 and 133. Access networks 120 and 122 may transmit and receive communications between devices 131, 132, and 133 and application server (AS) 104, other components of network 102, devices reachable via the Internet in general, and so forth. In one example, devices 131-133 may each comprise a mobile device, a cellular smart phone, a wearable computing device (e.g., smart glasses) a laptop, a tablet computer, a desktop computer, an application server, a bank or cluster of such devices, and the like. In one example, devices 131-133 may each comprise programs, logic or instructions for performing functions in connection with examples of the present disclosure for modifying a volumetric video to include an enhanced three-dimensional object model of an object from a two-dimensional source video. For example, devices 131-133 may each comprise a computing system or device, such as computing system 300 depicted in FIG. 3, and may be configured to provide one or more operations or functions in connection with examples of the present disclosure for providing a communication session including video content of a physical environment that is modified in accordance with a visualization action for a physical object, as described herein.

In one example, the device 131 is associated with a first user 191 at a first physical environment 140. As illustrated in FIG. 1, the device 131 may comprise a smartphone with a camera to capture video (e.g., 2D video) from the physical environment 140. For illustrative purposes, the physical environment 140 may include a reference point 160 which may be associated with the building 170. For instance, the building 170 may comprise a known landmark, and reference point 160 may denote a corner of the building 170. Alternatively, or in addition, wireless beacons (not shown) in physical environment 140 having known locations may be used as reference points, such as Institute of Electrical and Electronics Engineers (IEEE) 802.15 based-beacons, IEEE 802.11 wireless routers and/or access points (AP), cellular base stations (or more particularly, the base station antennas), etc. For instance, device 131 may determine its position via observed time difference of arrival (OTDA), barycentric triangulation, or a similar technique with reference to one or more wireless beacons. In one example, device 131 may communicate via access network 120 to provide a video of the first physical environment 140 to AS 104. In the present example, the device 131 may capture 2D video that includes images of a building 170 and a bird 180 (and which may also include sounds). The perspective 137 of the device 131 is also illustrated in FIG. 1. In one example, the device 131 may provide information from which the perspective 137 may be quantified, such as: position information (e.g., GPS coordinates, coordinates and/or a position vector in relation to reference point 160), orientation information (e.g., azimuth and/or elevation information derived from a gyroscope and compass), and so forth.

In one example, the 2D video may be processed by AS 104 as a "source video" as described herein. For instance AS 104 may select a volumetric video associated with at least one feature of the 2D source video from a library of volumetric videos stored at AS 104 and/or accessible to AS 104. AS 104 may then identify a first object in the source video, such as the bird 180, determine a location of the bird 180 within a space of the volumetric video, obtain a 3D object model of the bird, texture map the bird 180 to the 3D object model to produce a modified/enhanced 3D object model, modify the volumetric video to include the enhanced 3D object model, and so forth.

In one example, the match between the 2D source video and the volumetric video may be in accordance with one or more features that are shared by both the 2D source video and the volumetric video, such as time tags, location tags, object tags, event tags, keywords, etc. Alternatively, or in addition, a matching may be made by performing object detection/recognition processes with respect to either or both of the 2D source video or the volumetric video, and then confirming the presence of the same factors in both the 2D source video and the volumetric video. In one example, user 191 may be prompted by AS 104 and/or device 131 to annotate one or more objects and/or the 2D source video with keywords, tags, or the like. In one example, AS 104 may present to the user 191, via device 131, a ranked list of volumetric videos comprising potential matches to the 2D source video from which the user 191 may select one for further processing. For instance, results may be ranked by time (e.g., date and time, by the time of year/season, etc.), location, and/or environmental similarity (wet, snowy, clear, etc.) to the source video.

In one example, the position of the bird 180 within the space of the volumetric video may be determined based upon a position and orientation of the device 131. In one example, the range (distance) from device 131 to the bird 180 may be determined from a focus of the device 131. For instance, zoom and focus settings may indicate the approximate distance at which the image of a field of view of a camera of device 131 is placed in focus. In one example, the zoom and focus settings may be manually set by the user 191. However, the device 131 may alternatively or additionally calculate the distance based upon the settings of the zoom and/or focus controls. In one example, the position of the bird 180 may be determined by using features of building 170 as reference points/key points. For instance, building 170 may be a landmark for which full 3D information has been captured and stored in the volumetric video. As such, the position of the bird 180 may be determined by estimating distances to the one or more key points of the building 170 in accordance with the visual information of the 2D source video.

As stated above, the volumetric video may be modified to include the enhanced 3D object mode. In addition, AS 104 may also store the modified volumetric video, e.g., as a new volumetric video, as a replacement to the volumetric video, as a new version of the volumetric video, etc. The user 191, e.g., via device 131, may then obtain a presentation of the modified volumetric video from AS 104. For instance, AS 104 may create a 2D output video, e.g., a 2D projection/traversal of the 3D space of the volumetric video, and stream or otherwise transmit the output video to device 131. Alternatively, or in addition, the modified volumetric video may be provided to device 131, and device 131 may render the volumetric video in accordance with the 2D display capabilities of the device 131. For example, the user 191 may select one or more perspectives from within the space of volumetric video 150 from which to render the 2D output video. For instance, a user interface of device 131 may enable the user 191 to move a viewpoint left/right, up/down, forward/backward, etc., to select coordinates or define a position with respect to a reference point (e.g., reference point 160), and so forth. It should be noted that the perspective(s) represented in the 2D output video may be entirely different from the perspective(s) from which the user 191 captured the source video via device 131 (and may be entirely different from the current location of the user 191 and device 131). In addition, in a server-based example, AS 104 may also store the 2D output video that is created.

In one example, AS 104 may make the modified volumetric video and/or 2D output video available to other users (e.g., users 192 and 193). For example, as illustrated in FIG. 1, the device 132 may comprise a wearable computing device (e.g., a VR headset) and may present a space 150 of a volumetric video for user 192. In one example, device 132 may communicate via access network 122 to request the modified volumetric video, to receive the volumetric video and/or to receive at least a portion of the volumetric video to be used in rendering a portion of the space 150 that is currently within the perspective/view of the user 192, to provide position and orientation information of a view of the user to AS 104 to determine which portion of the volumetric video to provide, to provide commands to start, stop, pause, resume, etc., (e.g., in an example where the volumetric video is streamed from AS 104), and so forth.

To illustrate, user 192 may set a perspective from which to experience the visual contents of the volumetric video. For instance, a user interface of device 131 may provide for the user 191 to move a viewpoint left/right, up/down, forward/backward, etc., to select coordinates or define a position with respect to a reference point (e.g., reference point 160 in space 150), and so forth. In one example, the user 192 may change perspectives by changing a location, e.g., by walking, changing a focus, e.g., by moving the user's head and/or eyes, changing a zoom level via a specific command and/or via eye adjustment, and so on. As illustrated in FIG. 1, user 192 may be viewing the bird 180 and building 170 from an entirely different perspective from which the user 191 recorded the 2D source video in the physical environment 140. Notably, while the original volumetric video may not have included the bird 180, the modified volumetric video now includes the bird 180. In addition, the bird 180 is represented as a full 3D object that has been created from a 3D object model texture mapped with the 2D visual information of the bird 180 obtained from the 2D source video from device 131.

Similarly, a third user 193 may obtain and experience the volumetric video, or the 2D output video, via the device 133. For instance, device 133 may comprise a mobile computing device, such as a smartphone, a tablet, or the like with a 2D display screen. For instance, AS 104 may provide the 2D output video to device 133. Alternatively, or in addition, AS 104 may provide the modified volumetric video to device 133, and device 133 may render the volumetric video in accordance with the 2D display capabilities of the device 133. For example, the user 193 may select one or more perspectives from within the space of (modified) volumetric video 150 from which to render the 2D output video.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In one example, the system 100 may further include wireless or wired connections to sensors, radio frequency identification (RFID) tags, or the like from which devices may determine locations/positions, ranges/distances, bearings, and so forth within physical environment 140.

In one example, device 131 may capture additional objects in the 2D source video and may present to the user 191 options for removing or excluding such objects from the volumetric video to be modified. For instance, the user 191 may select the bird 180 to be texture mapped to a corresponding 3D object model and inserted into the volumetric video. However, imagery of one or more individuals may be captured in the 2D source video who did not consent to have their images included in a volumetric video. As such, the user 191 will skip the images of such individuals. It should also be noted that in one example, the original volumetric video may include detailed 3D imagery of building 170. As such, user 191 may create a volumetric video based upon the 2D source video captured via endpoint device 131 without having to utilize multiple cameras, without having to perform multiple takes from different perspectives, and so forth. In addition, other users who may generate their own 2D source videos at or near the same physical environment 140 may similarly benefit from the stored 3D content of the volumetric video including the building 170. In one example, new/modified volumetric videos may be stored in an efficient form by storing the building 170 as an object that may be re-used across different volumetric videos. Furthermore, other objects at physical environment 140 may be present in a volumetric video but may be selectively included or excluded from user edits/modifications to the volumetric video as described herein. Thus, these and other modifications are all contemplated within the scope of the present disclosure.

Figure 2:
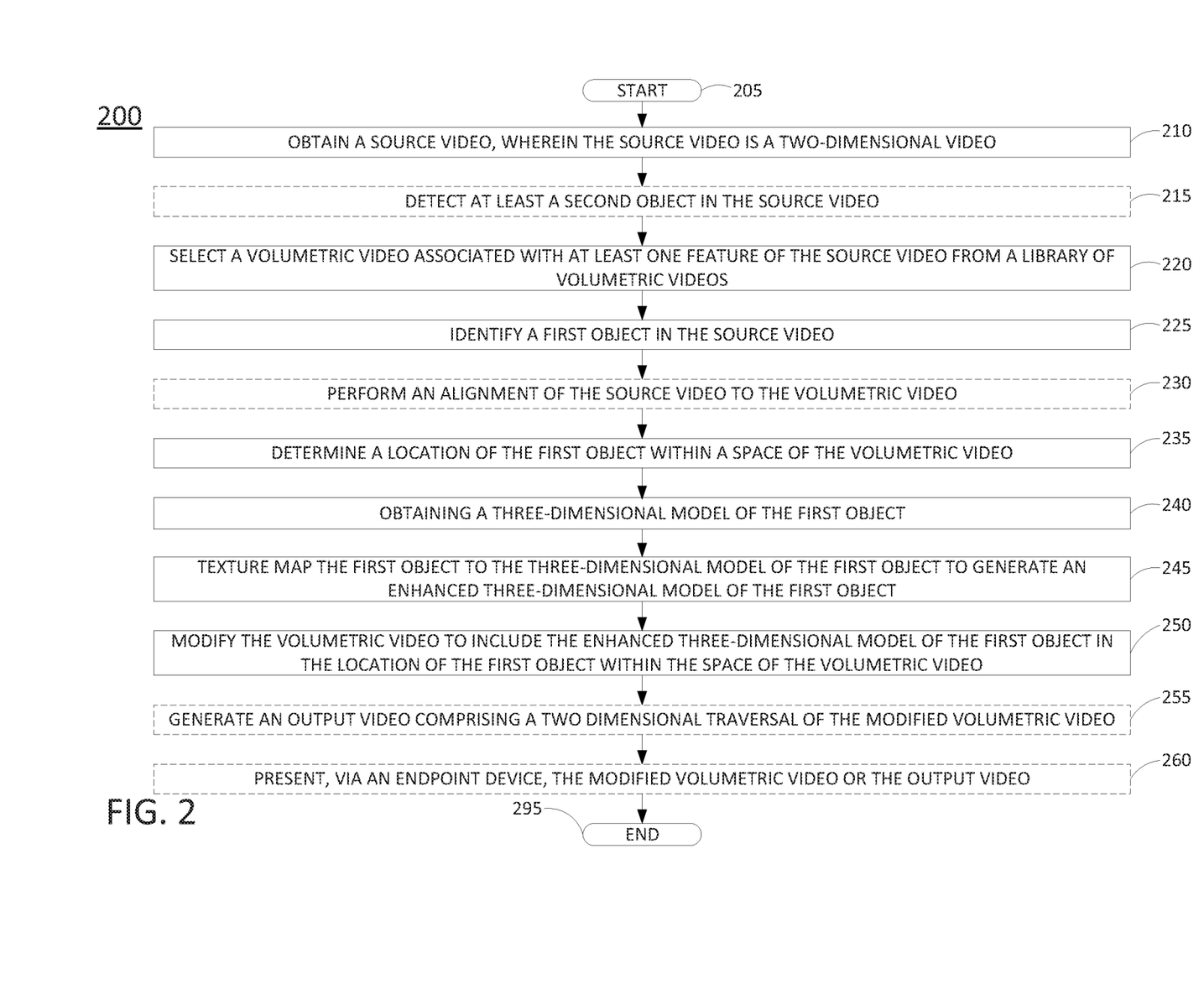
FIG. 2 illustrates a flowchart of an example method for modifying a volumetric video to include an enhanced three-dimensional object model of an object from a two-dimensional source video.

FIG. 2 illustrates a flowchart of an example method 200 for modifying a volumetric video to include an enhanced three-dimensional object model of an object from a two-dimensional source video, in accordance with the present disclosure. In one example, the method 200 is performed by a component of the system 100 of FIG. 1, such as by application server 104, device 131, and/or any one or more components thereof (e.g., a processor, or processors, performing operations stored in and loaded from a memory), or by application server 104, in conjunction with one or more other devices, such as devices 131-133, and so forth. In one example, the steps, functions, or operations of method 200 may be performed by a computing device or system 300, and/or processor 302 as described in connection with FIG. 3 below. For instance, the computing device or system 300 may represent any one or more components of application server 104, device 131, etc. in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and proceeds to step 210.

At step 210, the processing system may obtain a source video comprising a two-dimensional (2D) video. The source video may be a 2D video in a digital format, or may comprise a non-digital 2D video that may be converted to a digital format at step 210. In one example, step 210 may further include obtaining at least one feature of the source video, such as: location information, time information, an event tag, or a keyword. For instance, the location information may provide GPS coordinates, a landmark identifying the location, a name of a place, or the like. An event tag may distinguish between different events at a same place but at different times, e.g., a concert at a stadium versus a sporting event on a different day. A keyword can include information regarding the presence of an object (e.g., a name of a known object, such as Statue of Liberty, Empire State Building, the aircraft carrier Intrepid, etc.). In one example, features may also be specified by a user to be used in a later step for matching volumetric videos and the source video obtained by the processing system at step 210. For instance, the user may specify an identity of a producer of volumetric videos for which the user has a preference.

At optional step 215, the processing system detects an object in the source video (e.g., at least a "second" object). For instance, the second object could be a famous landmark, a street corner, a statute, a monument, or the like, where the second object is not specified as a feature in connection with step 210. In one example, the second object may be detected in accordance with one or more 2D object detection/recognition models (e.g., MLM/machine learning-based image detection models). It should also be noted that although the terms, "first," "second," "third," etc., are used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated.

At step 220, the processing system selects a volumetric video associated with at least one feature of the source video from a library of volumetric videos. In one example, step 220 may include determining that the volumetric video matches the at least one feature of the source video. For example, the at least one feature of the source video may be received at step 210 as described above. Alternatively, or in addition, the at least one feature of the source video may comprise the at least the second object that may be detected at optional step 215. In such an example, step 220 may include: detecting the at least the second object in the volumetric video, and selecting the volumetric video when the presence of the second object is so detected. For instance, as described above in connection with optional step 215, the second object could be a famous landmark, a street corner, a statute, a monument, or the like. Similarly, a second object could be a large portable exhibit, such that a volumetric video generated at one or more installation locations may still be paired with a 2D source video of the same exhibit from an entirely different physical location. In such case, the 2D source video and the volumetric video may be matched at step 220 based upon the same visual features. For example, the processing system may identify the second object because it is tagged in both the 2D source video and the volumetric video (e.g., keyword matching). In another example, the processing system may perform a matching of visual features, e.g., not necessarily detecting the second object per se, but detecting sufficient matching between low level and/or high level visual features of the respective 2D source video and the volumetric video.

In one example, the selecting may be in accordance with a ranked list of volumetric videos from the library of volumetric videos based upon a level of matching to the at least one feature of the source video. For instance, the volumetric video may be automatically selected, or the processing system may provide a ranked list from which the volumetric video is selected by a user. In one example, the ranking can be based upon how well the at least one feature matches, the number of features for which the match is confirmed, etc. For instance, ranking may be ordered by location, time, or environmental similarity, or a combination thereof. Similarly, in one example a user may specify that the volumetric video should match both the location and the time, or can specify that it just matches the location. A user may also specify a particular time that is different from the time of the source video. For instance, a user may want to place visual information recorded in the source video at a landmark/location during a historic event.

At step 225, the processing system identifies a "first" object in the source video. In one example, the first object may be detected in the source video in accordance with one or more 2D object detection/recognition models. The first object may be identified as a specific instance of an object type (e.g., a famous building, a specific person for which a 2D object detection/recognition model is available, etc.), or may be identified as an instance of an object type (e.g., "person," "building," "dog," "cat," etc., without identifying a specific person, building, dog, cat, etc.).

At optional step 230, the processing system may perform an alignment of the source video to the volumetric video. For example, the alignment may include a spatial alignment where the processing system may detect key points (e.g., of at least one object, such as the second object) in both the source video and the volumetric video, and calculate one or more adjustment factors to position the visual information of the source video correctly within the space of the volumetric video. For instance, the physical space may include reference points having known corresponding locations/positions in the space of the volumetric video from which the processing system may compute a transformation matrix to translate coordinates of objects in the source video into corresponding coordinates in the space of the volumetric video. The alignment may further include a time alignment of the source video and the volumetric video. For instance, the time of a frame of the source video may be determined in accordance with one or both of a start time and an end time, and the frame rate of the source video. In another example, each frame may be tagged with timing information. In addition, the volumetric video may similarly have a start time, end time and/or duration, frame rate, and similar information stored as metadata along with the visual information of the volumetric video. As such, frames of the source video may be paired with frames of the volumetric video having corresponding times. Alternatively, or in addition, alignment may be achieved with reference to one or more objects in motion. For instance, a ball may be bouncing and then come to rest in both the source video and the volumetric video. Thus, the processing system may determine that a frame in the source video and a frame in the volumetric video where the ball comes to rest are at a same time. However, it should again be noted that in some cases the intention of a user may be that the source video and the volumetric video be from different recording times. Thus, in one example, the user may be provided with a user interface to manually select a time alignment of the source video to the volumetric video.

At step 235, the processing system determines a location of the first object within a space of the volumetric video. In one example, the determining of the location of the first object within the space of the volumetric video is in accordance with the alignment performed at optional step 230.

At step 240, the processing system obtains a three-dimensional object model of the first object. In one example, the obtaining of the three-dimensional object model of the first object is in accordance with a catalog of two-dimensional objects and three-dimensional object models that are matched to the two-dimensional objects. In one example, the obtaining of the three-dimensional object model comprises matching the first object to one of the two-dimensional objects in the catalog, and obtaining, from the catalog, the three-dimensional object model that is matched to the two-dimensional object. In one example, the matching may be based upon keyword matching. For instance, a user may tag objects (e.g., including the first object and possibly other objects) in the 2D source video. These keywords, or tags, may be stored as metadata along with the 2D source video, and may be referenced by the processing system at step 240. Alternatively, or in addition, in one example, the matching may be in accordance with a machine learning-based image detection model. For instance, the matching may be based upon low level or high-level visual features. Matching may also be enhanced or confirmed with audio features, movement features, etc.

At step 245, the processing system texture maps the first object to the three-dimensional object model of the first object to generate an enhanced three-dimensional object model of the first object. The texture mapping may include diffuse mapping, two-part mapping/intermediate mapping to an intermediate object, bump mapping, etc.

At step 250, the processing system modifies the volumetric video to include the enhanced three-dimensional object model of the first object in the location of the first object within the space of the volumetric video. For instance, voxel data associated with the location of the first object within the space of the volumetric video may be changed to correspond to the three-dimensional object model of the first object. In one example, the voxel data may be changed across a plurality of frames in the volumetric video corresponding to times in which the three-dimensional object model of the first object are to be present in the volumetric video, e.g., in accordance with a time-alignment of optional step 230. Thus, frames of the source video may be matched to frames of the volumetric video. In another example, the time at which the source video was recorded may be different from when the volumetric video was recorded, or the volumetric video may be composited from video content taken at a plurality of different times. Accordingly, in one example, a user may be prompted to time align the source video to the volumetric video. Then the modification of the voxel data of the volumetric video may be in accordance with the temporally appropriate data of the enhanced three-dimensional object model.

At optional step 255, the processing system may generate an output video comprising a two dimensional traversal of the volumetric video that is modified. For instance, one or more perspective(s) in the output video may be different from the view(s)/perspective(s) of the source video and may comprise any number of changes in views/perspective, zooms, focuses, etc. In one example, the output video is generated in accordance with a selection by a user of at least one viewing perspective within the space of the volumetric video.

At optional step 260, the processing system may present, via an endpoint device, one or both of: the output video, or the volumetric video that is modified. The endpoint device may comprise a same endpoint device from which the source video may be obtained at step 210, or a different endpoint device.

Following step 250, or either of the optional steps 255 or 260, the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example the processor may repeat one or more steps of the method 200, such as steps 222-250, steps 225-260, etc. to continue to detect additional objects in the source video, to include in the volumetric video 3D object models enhanced in accordance with the respective additional objects, etc. In another example, a feature of the source video used for matching the volumetric video at step 220 may include a topic of the source video. For instance, in such an example, the method 200 may be expanded to include topic (e.g., theme and/or concept) detection in the source video and then selecting the volumetric video (or a plurality of matching volumetric videos) in accordance with the topic. For instance, the volumetric videos may be tagged with topics contained therein (manually or via application of topic detection algorithms). The processing system may then apply topic models (e.g., classifiers) for a number of topics to the source video to identify a topic, and match the source video to one or more volumetric videos tagged with the same topic. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Thus, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for modifying a volumetric video to include an enhanced three-dimensional object model of an object from a two-dimensional source video, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for modifying a volumetric video to include an enhanced three-dimensional object model of an object from a two-dimensional source video (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for modifying a volumetric video to include an enhanced three-dimensional object model of an object from a two-dimensional source video (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    obtaining, by a processing system including at least one processor, a source video, wherein the source video is a two-dimensional video depicting a scene from a physical environment;
    selecting, by the processing system, a volumetric video depicting the scene from the physical environment, wherein the volumetric video is selected from a library of volumetric videos;
    identifying, by the processing system, a first object that appears in the source video but does not appear in the volumetric video;
    determining, by the processing system, a location of the first object within a space of the volumetric video;
    obtaining, by the processing system, a three-dimensional object model of the first object;
    texture mapping, by the processing system, the first object to the three-dimensional object model of the first object to generate an enhanced three-dimensional object model of the first object; and
    modifying, by the processing system, the volumetric video to include the enhanced three-dimensional object model of the first object in the location of the first object within the space of the volumetric video.

2. The method of claim 1, further comprising:
    performing an alignment of the source video to the volumetric video, wherein the determining the location of the first object within the space of the volumetric video is in accordance with the alignment.

3. The method of claim 2, wherein the alignment further comprises a time alignment of the source video and the volumetric video.

4. The method of claim 1, wherein the obtaining the source video further comprises:
    obtaining at least one feature of the source video, wherein the at least one feature comprises at least one of:
    location information;
    time information;
    an event tag; or
    a keyword.

5. The method of claim 4, wherein the selecting comprises:
    determining that the volumetric video shares the at least one feature of the source video.

6. The method of claim 4, wherein the selecting is in accordance with a ranked list of volumetric videos from the library of volumetric videos based upon a level of matching to the at least one feature of the source video.

7. The method of claim 1, wherein the obtaining the source video further comprises:
    detecting a second object that appears in the source video, wherein at least one feature of the source video comprises the second object.

8. The method of claim 7, wherein the selecting comprises:

detecting the second object appearing in the volumetric video.

9. The method of claim 1, further comprising:
presenting, via an endpoint device, the volumetric video that is modified.

10. The method of claim 1, further comprising:
generating an output video comprising a two dimensional traversal of the volumetric video that is modified.

11. The method of claim 10, wherein the output video is generated in accordance with a selection by a user of at least one viewing perspective within the space of the volumetric video.

12. The method of claim 11, wherein the at least one viewing perspective is one of a plurality of viewing perspectives within the space of the volumetric video for which a two dimensional traversal of the volumetric video is available.

13. The method of claim 10, further comprising:
presenting, via an endpoint device, the output video.

14. The method of claim 13, wherein the source video is obtained from the endpoint device.

15. The method of claim 1, wherein the obtaining the three-dimensional object model of the first object is in accordance with a catalog of two-dimensional objects and three-dimensional object models that are matched to the two-dimensional objects.

16. The method of claim 15, wherein the obtaining the three-dimensional object model comprises:
matching the first object to one of the two-dimensional objects in the catalog; and
obtaining, from the catalog, the three-dimensional object model that is matched to the one two-dimensional object.

17. The method of claim 16, wherein the matching is in accordance with a machine learning-based image detection model.

18. The method of claim 1, wherein the modifying comprises changing voxel data of the volumetric video that corresponds to the first object so that the voxel data corresponds to the enhanced three-dimensional object model.

19. A non-transitory computer-readable medium storing instructions which, when executed by a processing system including at least one processor, cause the processing system to perform operations, the operations comprising:

obtaining a source video, wherein the source video is a two-dimensional video depicting a scene from a physical environment;
selecting a volumetric video depicting the scene from the physical environment, wherein the volumetric video is selected from a library of volumetric videos;
identifying a first object that appears in the source video but does not appear in the volumetric video;
determining a location of the first object within a space of the volumetric video;
obtaining a three-dimensional object model of the first object;
texture mapping the first object to the three-dimensional object model of the first object to generate an enhanced three-dimensional object model of the first object; and
modifying the volumetric video to include the enhanced three-dimensional object model of the first object in the location of the first object within the space of the volumetric video.

20. A device comprising:
a processing system including at least one processor; and
a computer-readable medium storing instructions which, when executed by the processing system, cause the processing system to perform operations, the operations comprising:
obtaining a source video, wherein the source video is a two-dimensional video depicting a scene from a physical environment;
selecting a volumetric video depicting the scene from the physical environment, wherein the volumetric video is selected from a library of volumetric videos;
identifying a first object that appears in the source video but does not appear in the volumetric video;
determining a location of the first object within a space of the volumetric video;
obtaining a three-dimensional object model of the first object;
texture mapping the first object to the three-dimensional object model of the first object to generate an enhanced three-dimensional object model of the first object; and
modifying the volumetric video to include the enhanced three-dimensional object model of the first object in the location of the first object within the space of the volumetric video.

\* \* \* \* \*